Oct. 8, 1963  R. G. DEXTER  3,106,109
INTERMITTENT MOVEMENT
Filed Aug. 2, 1961  5 Sheets-Sheet 1
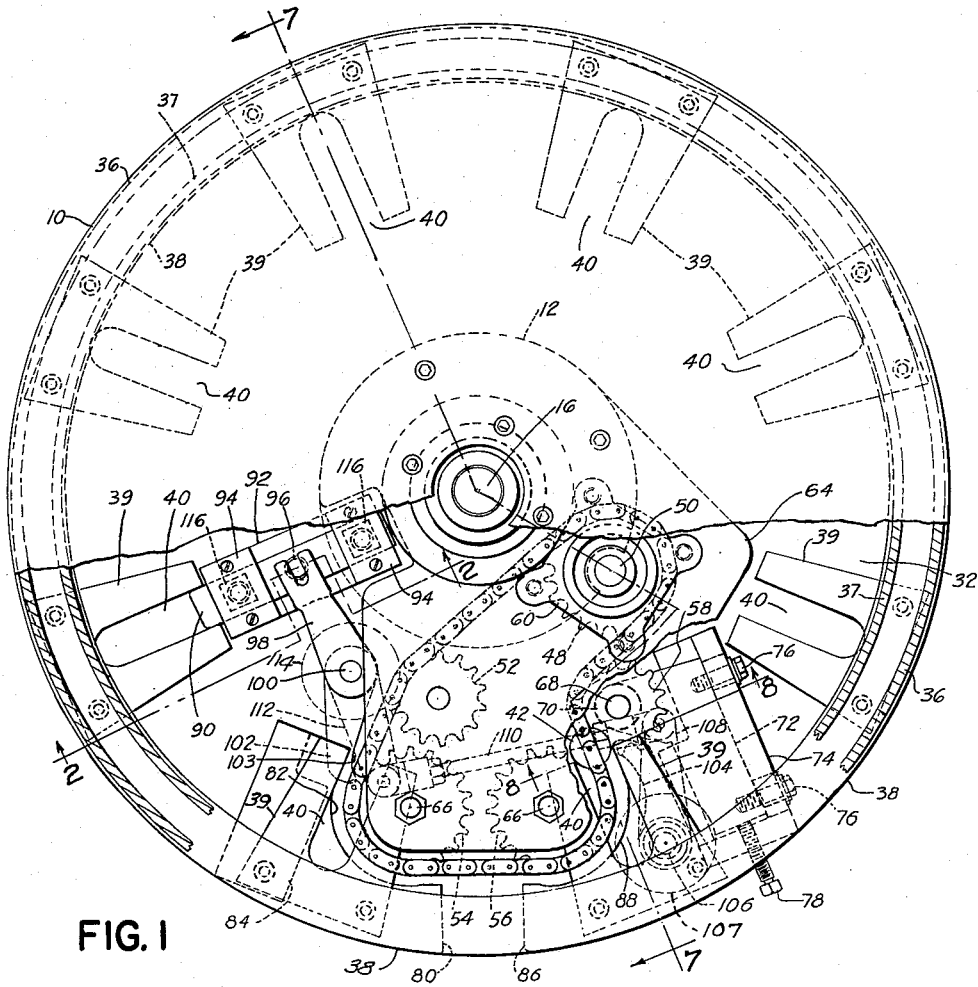
FIG. 1
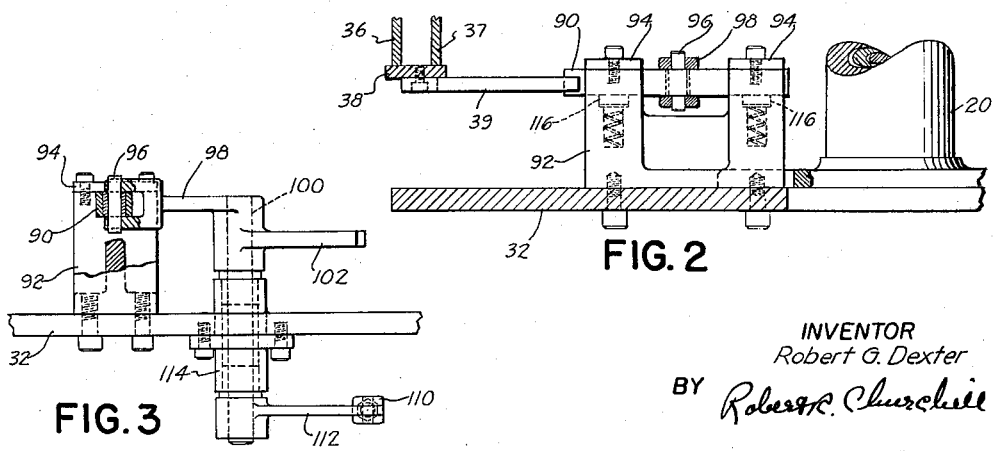
FIG. 2
FIG. 3
INVENTOR
Robert G. Dexter
BY
Robert C. Churchill
ATTORNEY

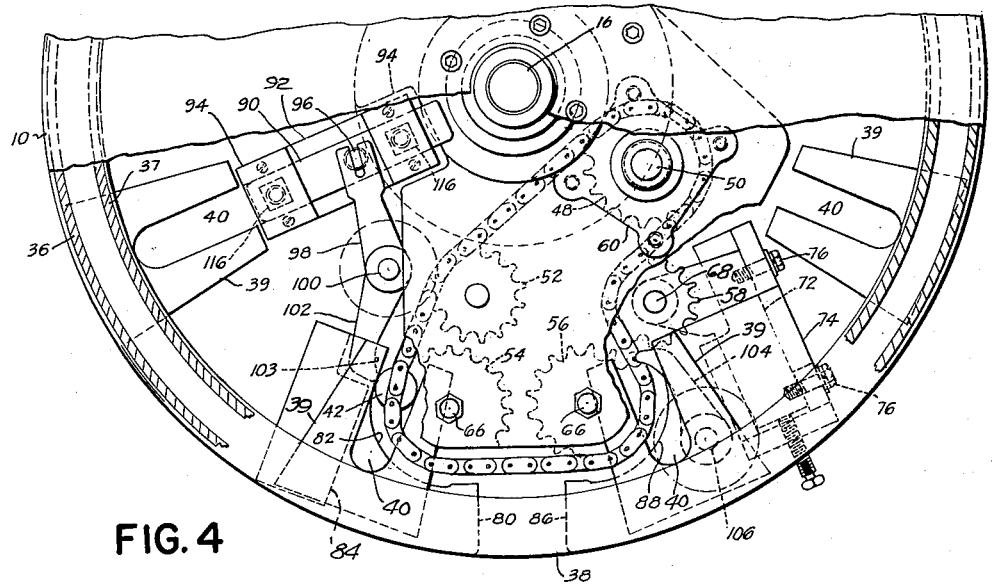
FIG. 4
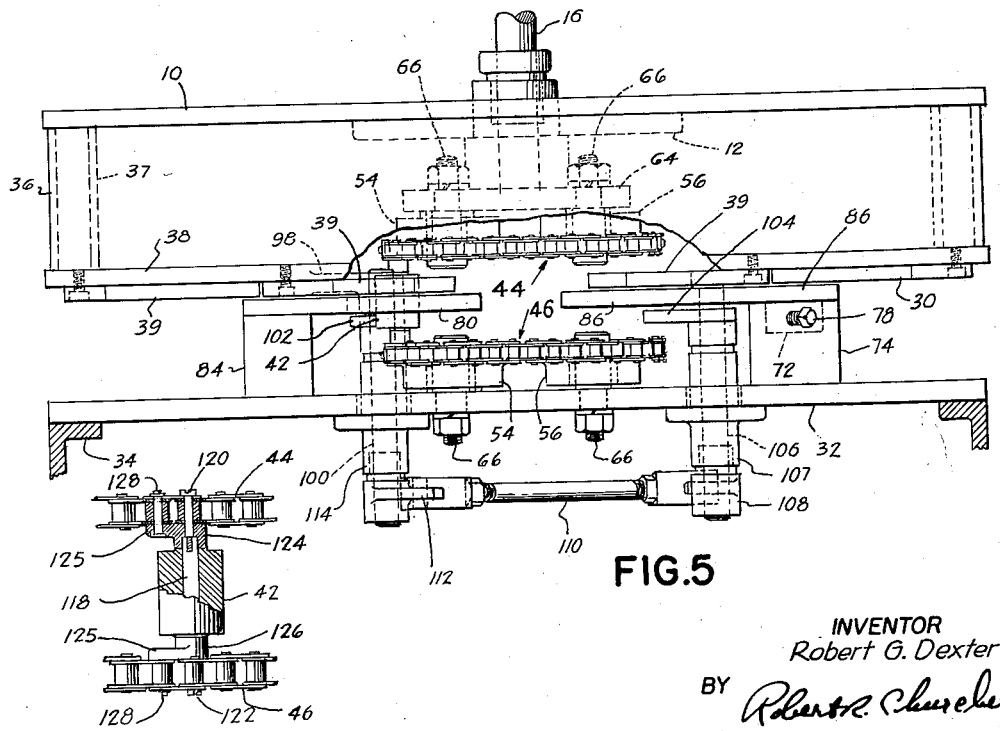
FIG. 5
FIG. 6
INVENTOR
Robert G. Dexter
BY Robert R. Churchill
ATTORNEY Oct. 8, 1963     R. G. DEXTER     3,106,109
INTERMITTENT MOVEMENT
Filed Aug. 2, 1961     5 Sheets-Sheet 3

INVENTOR
Robert G. Dexter
BY Robert L. Churchill
ATTORNEY

United States Patent Office 3,106,109
Patented Oct. 8, 1963

3,106,109
INTERMITTENT MOVEMENT
Robert G. Dexter, Harvard, Mass., assignor to Barkley & Dexter, Incorporated, Fitchburg, Mass., a corporation of Massachusetts
Filed Aug. 2, 1961, Ser. No. 128,842
20 Claims. (Cl. 74—822)

This invention relates to an intermittent movement.

The invention has for an object to provide a novel and improved intermittent movement of the type having a high ratio of dwell time to index time and which is characterized by novel structural features enabling a smooth and positive intermittent movement in a simple and efficient manner.

With this general object in view and such others as may hereinafter appear, the invention consists in the intermittent movement and in the various structures, arrangements and combinations of parts hereinafter described and particularly defined in the claims at the end of this specification.

In the drawings illustrating the preferred embodiment of the invention:

FIG. 1 is a plan view of apparatus embodying the present intermittent movement, some of the parts being broken away and shown in cross section;

FIG. 2 is a detail view in side elevation of the locking mechanism shown partly in cross section as seen from the line 2—2 of FIG. 1;

FIG. 3 is an end view of the locking mechanism shown partly in cross section;

FIG. 4 is a partial plan view of the apparatus shown in FIG. 1 with the parts in a different position of operation;

FIG. 5 is a side elevation of the apparatus shown in FIG. 4, some of the parts being broken away;

FIG. 6 is a cross sectional detail view of the drive roller supported between the chains;

Figure 11:
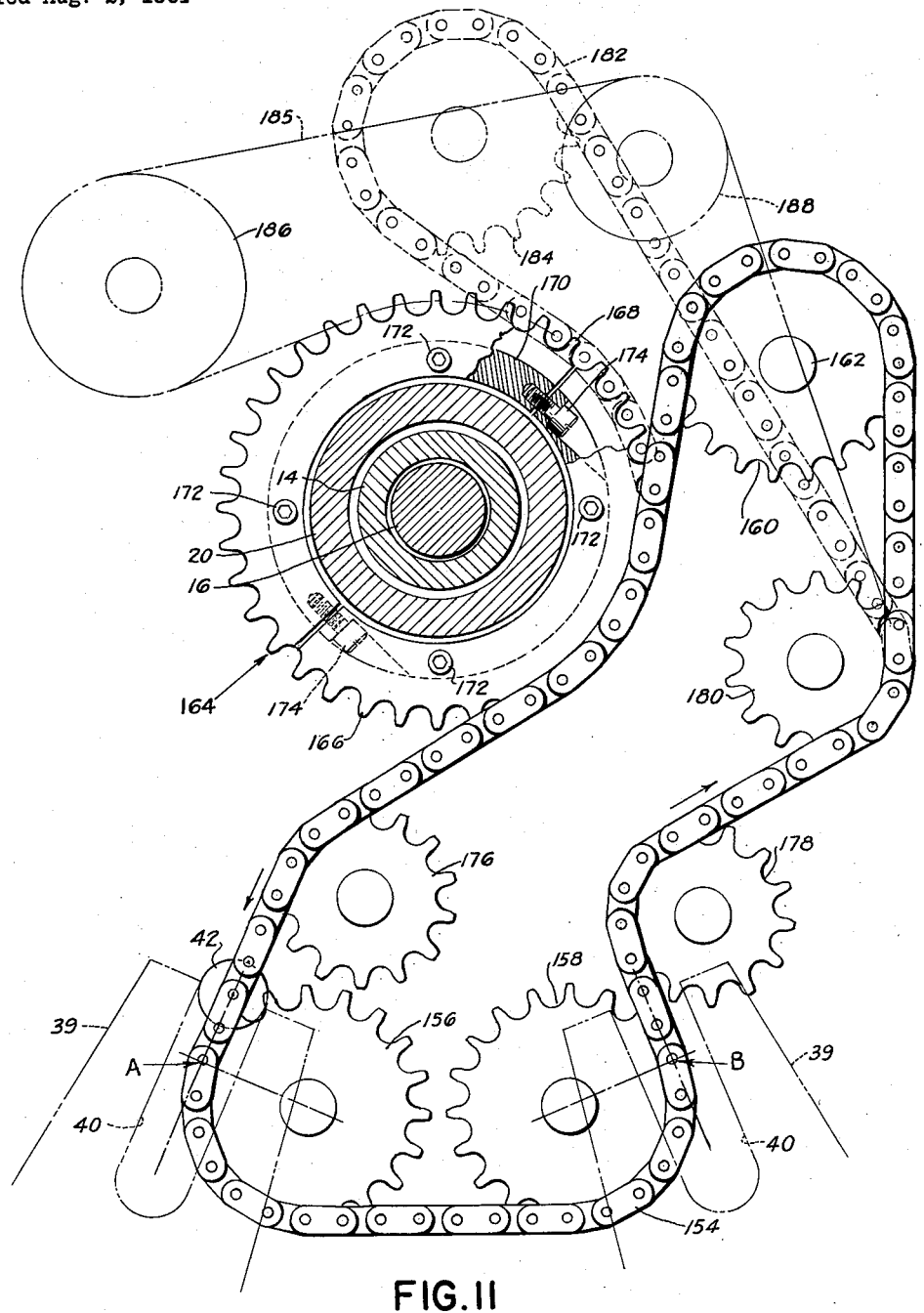
Figure 12:
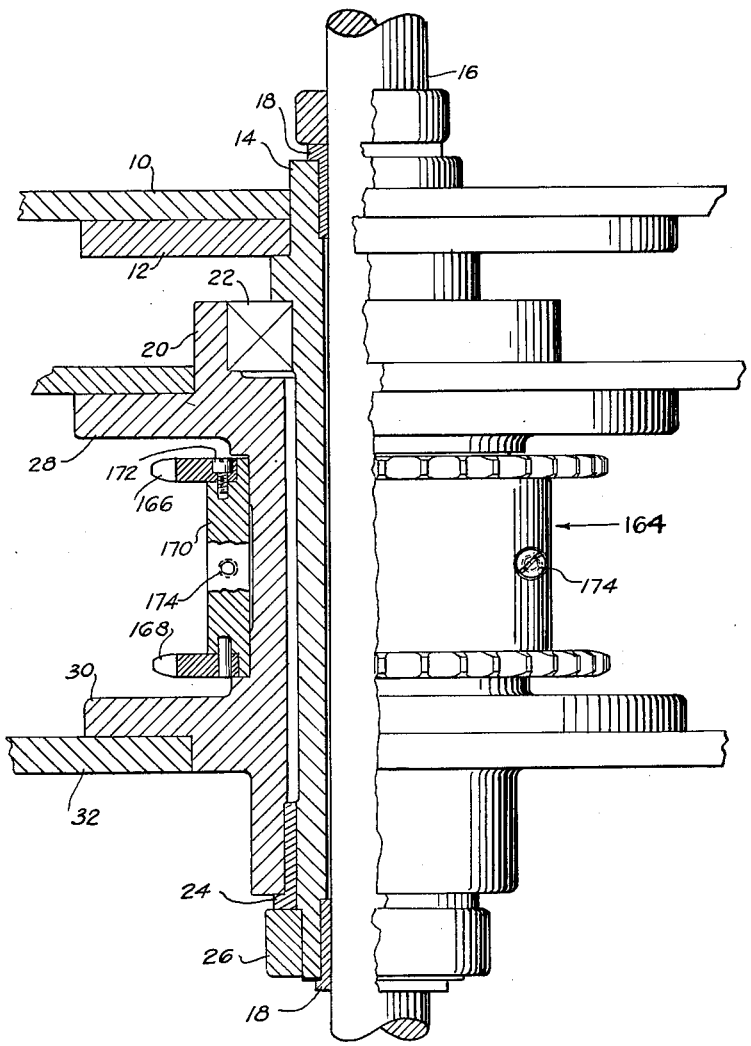

FIG. 11 is a more or less schematic plan view showing several arrangements in full, dotted and broken lines, each designed to accommodate chains of increased length to change the ratio between idle time and indexing time of the intermittent movement; and FIG. 12 is a view partly in cross section of the central bearing portion of the apparatus shown in FIG. 11 arranged to accommodate chains of increased length.

In general the present invention contemplates an improvement in the intermittent movement illustrated and described in the United States Patent to John V. Davis, No. 2,486,128, issued October 25, 1949. The Davis patent discloses an intermittent movement of the lock-and-pin type having the pin carrier disposed internally of a slotted driven ring and constructed in such a manner as to enable a high ratio of dwell time to index time. The pin carrier comprises a continuously driven chain which is guided around sprockets arranged to engage the pin with a slot to effect an intermittent movement and to withdraw the pin from the slot at the end of such intermittent movement, the chain being arranged to guide the driving pin to provide a favorable angle of pin entrance and departure with respect to the slots of the driven member.

In accordance with one feature of the present invention the continuously moving chain which carries the driving pin or roller is arranged to effect entrance and departure of the roller radially of the slots whereby to provide smoother and more positive operation. Another novel feature of the present invention includes the provision of stationary curved guiding elements at the entrance and departure stations which follow the path of the driving roll during the indexing movement around the driving chain sprockets and extend radially to guide the roll to and from the sprockets. Prior to the present invention it was found that there was a tendency for the driving roll to urge the table being indexed a slight distance beyond the exact indexing position. This was due to the inability to maintain the chain tight enough to prevent such overthrow. As a result, vibration and chattering would occur at the end of the indexing operation. In accordance with the present invention the provision of stationary guides at the entrance and departure stations provides a positive and smoothly operating starting and stopping movement.

Another improvement contemplated by the present invention relates to the locking mechanism. The improved locking mechanism comprises a radially movable bar engageable in a radial slot, the bar being moved out of its slot to free the table when the driving roll enters its slot, and being moved into a succeeding slot when the driving roll exits from the slot at the end of the indexing movement.

Referring now to the drawings, 10 represents a circular table mounted for intermittent rotary movement and which may be provided with circumferentially spaced article supports of any desired form, not shown, which are required to be intermittently moved into operative relation to successive stations for performing various operations on the article. As herein shown, the table 10 is secured to a disk 12 supported for rotation with a sleeve shaft 14 journaled on a central shaft 16. The central shaft 16 is mounted for rotation in bushings 18 in the sleeve shaft 14, and the latter is mounted for rotation in a stationary central bearing member 20 provided with a ball bearing 22 at its upper end and a bushing 24 at its lower end. A collar 26 is provided on the sleeve shaft below the bushing 24. The stationary bearing member 20 is provided with an upper flange 28 and a lower flange 30, the latter being secured to a supporting disk 32 which may be connected to a portion of the frame of the apparatus as indicated at 34.

Figure 7:
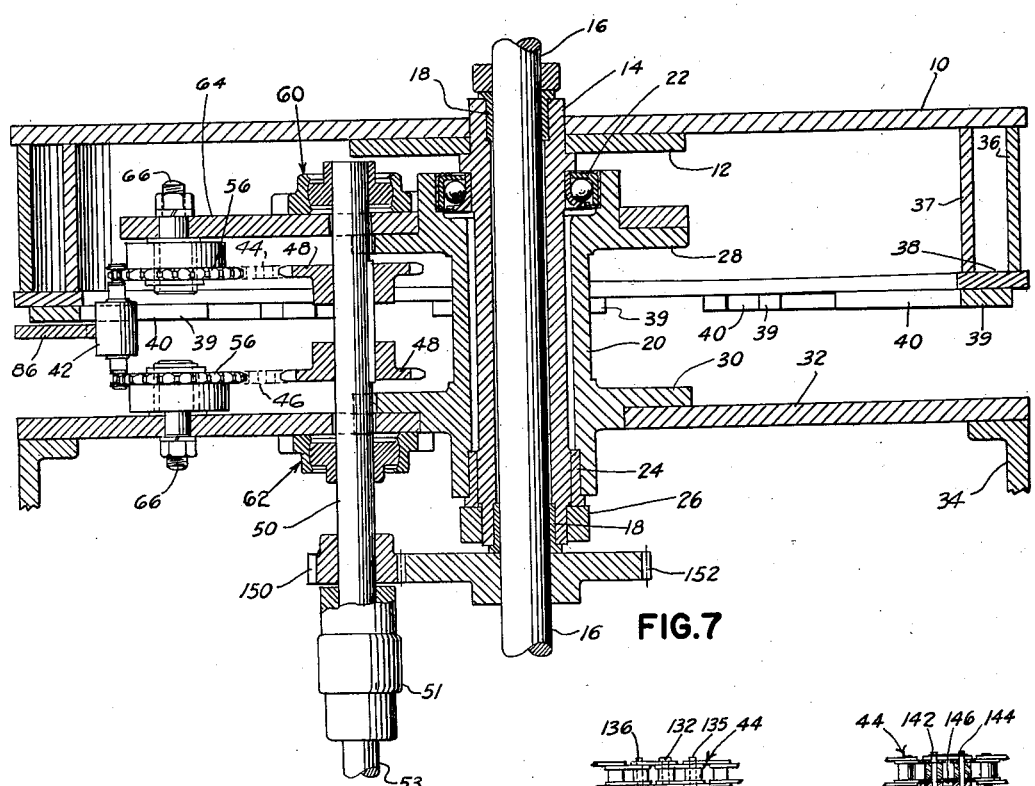
FIG. 7 is a vertical section of the driving mechanism as seen from the line 7—7 of FIG.1.

As shown in FIG. 7, the table 10 is provided with two concentric supporting rings 36, 37 depending therefrom which support an annular member 38 at their lower ends. Secured to and extended radially inward from the annular member 38 are a plurality of circumferentially spaced slotted indexing members 39, the slots 40 being open at their inner ends. In the embodiment of the invention illustrated in FIG. 1 there are eight slots spaced 45° apart, and provision is made for intermittently moving the table through 45° by means of an indexing roller 42 carried between upper and lower chains 44, 46. The chains are continuously driven and are arranged to guide the roller into radial alignment with a slot 40 and to move the table through 45° while engaged in the slot whereupon the roller is withdrawn radially from the slot. It will be apparent that the indexing time as related to the idle time depends on the length of the chain and that the number of slots 40 or the length of the chain may be varied to provide different ratios of indexing time to idle time of the table.

As illustrated in FIG. 1, the chains are guided over upper and lower drive sprockets 48 which are keyed to a drive shaft 50; over idler sprockets 52 and indexing sprockets 54; then over a second pair of indexing sprockets 56 and chain tightener sprockets 58 back to the drive sprockets 48. It will be observed that the sprockets 52 and 54 are arranged to align the chains and the roller carried thereby into radial alignment with a slot 40, and the indexing movement occurs as the roller 42 passes between the sprockets 54, 56. It will be further observed that the sprockets 56 and sprockets 58 are arranged to guide the chains and the roller carried thereby in a radial direction as it leaves the slot 40.

Figure 8:
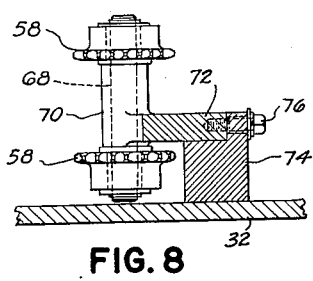
FIG. 8 is a cross sectional detail of the chain tightening device taken on the line 8—8 of FIG. 1.

As shown in FIG. 7, the drive shaft 50 is journaled for rotation in upper and lower bearing units 60, 62. The upper bearing unit 60 is carried by a plate 64 secured to the upper flange 28 of the stationary bearing member 20, and the lower bearing unit 62 is carried by the stationary supporting disk 32. The indexing sprockets 54 and 56 are mounted for rotation on studs 66 secured to the plate 64 and disk 32, respectively, as shown in FIGS. 5 and 7. The idler sprockets 52 may be similarly supported. As shown in FIGS. 1 and 8, the chain tightener sprockets 58 are supported for rotation on a shaft 68 carried by a hub member 70 formed integrally with a longitudinally adjustable member 72 mounted for sliding adjustment in a grooved bracket 74 secured to the stationary disk 32. As shown in FIGS. 1 and 8, the member 72 is adjustably secured to the bracket 74 by bolts 76 which are extended through slotted openings formed in a side wall of the bracket. A set screw 78 threadedly engaged with an end wall of the bracket is arranged to engage the end of the member 72. In order to tighten the chain the bolts 76 may be loosened, and the set screw 78 is then rotated to move the member 72 forwardly whereupon the bolts 76 may be again tightened to hold the chain tightener unit in its adjusted position. It will be observed that the adjusting member 72 extends longitudinally in a plane parallel to the radial extension of the slot 40 and the chain guided therethrough so that adjustment of the chain tightener sprocket does not disturb or displace the radial alignment of the slot and the chain. The lower end of the drive shaft 50 may be connected by a coupling 51 to a shaft 53 which may be driven through any usual or preferred driving mechanism, not shown.

From the description thus far it will be seen that upon movement of the chain in a counterclockwise direction the roller 42 will enter a radially aligned slot 40, and as the roller moves from the sprockets 54 to 56 the table 10 is intermittently moved through 45° whereupon the roller leaves the slot. During the idle period of the table the continuously moving roller is carried around the supporting sprockets until it is guided into alignment with a succeeding slot 40 to perform a second indexing operation. In order to positively control the movement of the indexing roller 42 as it enters the slot 40, a guide plate 80 having an arcuate guiding surface 82 for the roller is provided at the station where the roller enters the slot 40. As shown in FIGS. 1 and 5, the guide plate 80 is secured to and extended from a bracket 84 attached to the stationary disk 32. It will be observed that the guide plate 80 is disposed in a plane immediately below the slotted indexing members 39, and the arcuate guiding surface 82 is concentric with the sprockets 54 and is tangent to the further edge of an adjacent indexing slot 40. A similar roller guide plate 86 having an arcuate surface 88 is provided at the point where the roller leaves the slot 40 at the end of an indexing operation. As shown in FIG. 5, the plate 86 is secured to and extended from the top of the idler unit bracket 74 and also serves to confine the idler adjusting member 72 in its groove to prevent upward displacement thereof. The arcuate surface 88 is likewise concentric with the sprockets 56 and is tangent to the further edge of the adjacent indexing slot 40. In operation the provision of the roller guide plates 80, 86 at the roller entrance and departure stations, respectively, serves to positively control the intermittent movement of the table so as to prevent overthrow and consequent chattering of the driving elements at the end of the intermittent movement.

Provision is also made for automatically locking the table 10 at the end of the intermittent movement by operation of the drive roller being radially withdrawn from its slot 40, and for unlocking the table by operation of the drive roller entering a succeeding slot 40. As herein shown, the locking mechanism includes a radially movable locking bar 90 arranged to be moved into an adjacent slot 40 at the end of an intermittent movement to lock the table in its moved position when the roller 42 leaves its slot, and to be withdrawn from the slot when the roller 42 enters its slot. As herein shown, the bar 90 is slidable in grooves formed in a bracket 92 secured to the supporting disk 32. The bar is held from vertical displacement by retaining plates 94 and is provided with a pin 96 extending therethrough for cooperation with a forked arm 98 fast on the upper end of a shaft 100. A curved arm 102, also fast on the shaft 100, has its free end arranged in one position of operation to be disposed in the path of the roller 42 at the entrance station of the slot 40, as shown in FIG. 1, at which time the bar 90 is in its outwardly moved or locked position in engagement with a slot 40. In operation, when the radially aligned driven roller 42 enters its slot 40, the roller engages the free end of the arm 102 to rock the same in a clockwise direction to effect retraction of the bar from the slot to unlock the table.

The drive roller 42 then continues its indexing movement to move the table through 45°, and during the withdrawal movement the roller engages the free end of a second curved arm 104 arranged in the path thereof to rock the same in a clockwise direction. Movement of the curved arm 104 in a clockwise direction is arranged to effect locking of the table and resetting of the curved arm 102 into the path of the roller for a succeeding indexing movement. As herein shown, the arm 104 is fast on the upper end of a shaft 106 journaled in a bearing unit 107 secured to the supporting disk 32. The lower end of the shaft 106 extends beyond the bearing unit and is provided with an arm 108 connected by a link 110 to an arm 112 fast on the lower end of the shaft 100. The shaft 100 is similarly journaled in a bearing unit 114.

With this construction it will be seen that when the drive roller 42 enters its slot preparatory to initiating an indexing movement, the arm 102 is rocked clockwise to effect unlocking of the table and, simultaneously therewith, the second arm 104 is rocked in a counterclockwise direction into the path of the roller at the withdrawing station through the linkage described. In order to maintain the locking bar 90 in its locked position and to prevent inadvertent displacement thereof during the indexing movement the bracket 92, which supports the locking bar, is provided with spring pressed friction plates 116 which bear against the underside of the bar as shown in FIG. 2. Thereafter, at the end of the indexing movement, when the roller leaving the slot at the withdrawing station engages the arm 104 to rock it in a clockwise direction, the bar 90 is moved into locking position, and the arm 102 is rocked counterclockwise into the path of the drive roller to be engaged by the roller during a succeeding indexing movement. In practice the provision of a radially movable locking bar arranged to be moved into locked position by the withdrawal of the roller from its slot 40 at the end of the intermittent movement of the table, and to be moved into its unlocked position by the roller entering its slot at the start of the intermittent movement provides a positive and smoothly operating locking mechanism.

It will be observed that in operation the radially aligned drive roller 42 enters its slot 40 in a radial direction and continues its radial movement within the slot for a short distance before the intermittent movement of the table is initiated, and that the arm 102 is engaged by the entering roller 42 during such radial movement within its slot. Likewise, it will be observed that at the end of the intermittent movement the drive roller 42 is guided a short distance in a radial direction within the slot before it leaves the slot and that the arm 104 is engaged by the roller during such radial movement within the slot. It will also be seen that the intermittent movement of the table is initiated at the entrance station when the radially moved roller arrives at a point of tangency with the pitch line of the indexing sprocket 54, and that the intermittent movement is terminated at the withdrawal station when the roller arrives at the point of tangency of the radial center line of the slot with the pitch line of the indexing sprocket 56.

Another feature of the present locking mechanism affording smooth and efficient operation resides in the harmonically curved engaging surface 103 of the arm 102 arranged when engaged by the entering roller 42 to be smoothly and harmonically rocked in a clockwise direction to effect unlocking of the table. As herein illustrated, the free end of the arm 102 is disposed substantially at the point of tangency of the radial center line of the slot with the pitch line of the sprocket 54 so that in operation complete unlocking of the table occurs substantially simultaneously with or immediately before arrival of the roller at the point of initiation of the intermittent movement.

Figures 9, 10:
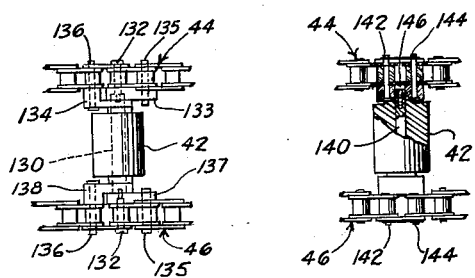
FIGS. 9 and 10 are detail views similar to FIG. 6 showing modified arrangements for supporting the drive roller between the chains.

Novel provision is made for connecting the drive roller 42 between the upper and lower chains 44, 46 wherein the connection is made between two or more adjacent link pins of each chain to provide a relatively rigid attachment. In one embodiment of the invention the roller 42 is mounted on a pin 118 supported between upper and lower threaded shoulder studs 120, 122 extended through the links of the chains and through brackets 124, 126 in which the ends of the pin 118 are received as shown in FIG. 6. Laterally extended portions 125 of each bracket are connected by pins 128 to the next adjacent links of the chains as shown. A modified form of connecting means for the roller 42 is shown in FIG. 9 wherein the roller is likewise mounted on a pin 130 connected to the upper and lower chains by threaded shoulder studs 132. In this embodiment two upper brackets 133, 134 are connected to the pin 130, one bracket 133 being also connected to a preceding link pin 135, and the other bracket 134 being also connected to a succeeding link pin 136 of the upper chain 44. Two lower brackets 137, 138 are similarly connected to the lower chain 46. In a still further embodiment of the connecting means, as shown in FIG. 10, the roller 42 is mounted on a pin 140 disposed intermediate two of the chain link pins 142, 144. The pin 140 is secured to upper and lower brackets by screws 146, the brackets being connected to the two link pins as shown.

From the above description it will be seen that in operation a high ratio of dwell time to index time is provided, and that such ratio is dependent on the length of the chain. In the embodiment of the invention illustrated in FIG. 1, the length of the chain is three times the length of the distance traveled during the indexing operation so that a ratio of two to one is provided. Also the diameter of the driving sprockets 48 is related to the indexing time so that one revolution of the drive sprocket will move the roller through a distance equal to the length of the chain moved during the indexing operation. Thus, three revolutions of the drive shaft 50 and the sprockets 48 carried thereby will complete one cycle of operation, including one revolution of indexing time and two revolutions of dwell time, to provide a 2 to 1 ratio of dwell time to indexing time. This feature of applicant's invention enables the central shaft 16 to be driven in timed relation to the rotation of the intermittently rotated table 10 by suitable driving connections, such as the gear connections indicated in FIG. 7 at 150, 152 between the drive shaft 50 and the central shaft. In the illustrated embodiment of the invention the gear ratio between the drive shaft 50 and the central shaft is 3 to 1 so that while the drive shaft 50 rotates 3 revolutions to produce a cycle of indexing time and dwell time, the central shaft 16 will be rotated through 1 revolution. It will be appreciated that this feature is of particular advantage when it is desired to provide intermittently operated mechanisms operatively connected to the central shaft for cooperation with the intermittently moved article supports carried by the work table or other intermittently operated devices cooperating therewith.

Referring now to FIG. 11, several arrangements therein shown are designed to accommodate chains of increased length within the confines of the rotary table whereby to change the ratio between idle time and indexing time of the intermittent movement. The double chain 154, comprising upper and lower chains between which the drive roller 42 is carried and which is indicated in full lines in FIG. 11, is of a length such as to provide a 3 to 1 ratio of dwell time to indexing time. Thus, the length of the chain is four times the distance traveled by the chain during the effective indexing time, such distance being clearly represented in FIG. 11 as the distance between point A, the point of tangency between the chain and the center line of the slot 40 with the pitch line of the double indexing sprocket 156 at the entrance station of the drive roller 42 and at which point the intermittent movement is initiated, and point B, the point of tangency between the chain and the center line of the slot with the double indexing sprocket 158 at the withdrawing station of the roller 42 at which point the intermittent movement is terminated. This distance is also equal to the pitch diameter of the driving sprocket 160 so that four revolutions of the drive shaft 162 will provide a cycle of three revolutions of dwell time to one revolution of indexing time. It will be apparent that in order to drive the central shaft 16 one revolution during a cycle of dwell time and indexing time, the gearing between the drive shaft 162 and the central shaft 16 will be in the ratio of 4 to 1.

Extending the length of the chain in the area confined within and partially overlapping the inwardly extended slotted members 39 presented a problem of guiding the elongated endless chain 154 therein and, as shown in FIGS. 11 and 12, this was solved by providing a split double idler sprocket indicated generally at 164 mounted for rotation about the central bearing member 20. As shown in FIG. 12, the upper and lower split sprockets 166, 168 are secured to a split hub 170 by screws 172, and the split hub is connected for rotation about the bearing member 20 by bolts 174. Thus, the chain 154 runs over the driving sprocket 160, the split idler sprocket 164, idler 176, indexing sprockets 156, 158, chain tightening sprocket 178 and idler sprocket 180 back to the driving sprocket 160.

The chain 182, indicated by dotted lines in FIG. 11, is increased in length such as to provide a 4 to 1 ratio of dwell time to indexing time, the chain length being five times the length of the distance A—B traveled by the chain during the effective indexing time. The chain 182 is arranged to run over a drive sprocket 184 and the split idler sprocket 164 to be further guided through the indexing path in a manner similar to chain 154 to return to the drive sprocket 184 as shown. As further diagrammatically indicated by dot and dash lines in FIG. 11, a chain 185 of a length adapted to provide a 5 to 1 ratio of dwell time to indexing time is similarly arranged to run over a drive sprocket 186, around the split idler sprocket 164, around the sprockets defining the indexing path and over idler sprockets 180, 188 back to the driving sprocket 186. It will be understood that gearing connections between the driving shaft and the central shaft 16 may be provided in each embodiment to maintain a predetermined cyclical relationship between the indexing operation and the shaft 16.

From the above description of the preferred embodiment of the invention it will be seen that the present intermittent movement of the lock-and-pin type in which the pin carrier is disposed internally of a driven slotted ring provides a high ratio of dwell time to indexing time and embodies novel structure such as to enable a smooth and positive intermittent operation.

While the preferred embodiment of the invention has been herein illustrated and described, it will be understood that the invention may be embodied in other forms within the scope of the following claims.

Having thus described the invention, what is claimed is:

1. In apparatus of the character described, in combination, a circular table mounted for rotary movement, and means for intermittently rotating the table comprising a plurality of circumferentially spaced and radially extended slotted members carried by said table, said members being directed inwardly from the periphery of the table and having radial slots open at their inner ends, a continuously driven chain disposed within the periphery of the table and carrying a roller for engagement with successive slots to effect intermittent movement of the table, means for driving said chain, and auxiliary means for guiding said chain to cause the roller to enter a slot in a radial direction prior to initiating the intermittent movement and to cause the roller to leave the slot in a radial direction upon termination of the intermittent movement.

2. The combination as defined in claim 1 wherein the guiding means comprises a plurality of sprockets including a pair of spaced indexing sprockets disposed within the segment defined by the radial center lines of two adjacent slots and arranged with their pitch lines tangerial to respective ones of said radial center lines, the intermittent movement being initiated at one point of tangency by a roller which has entered the slot, and being terminated at the other point of tangency by the roller leaving the slot.

3. The combination as defined in claim 2 wherein the guiding means includes a chain tightener idler sprocket, and means for supporting the same for adjustment in a plane parallel to the adjacent radial slot whereby to maintain the radial alignment of the chain with the slot.

4. The combination as defined in claim 2 wherein the roller is guided to travel in a radial direction within the slot for a short distance prior to reaching said one point of tangency, and to travel in a radial direction within the slot for a short distance after leaving said other point of tangency.

5. The combination as defined in claim 2 wherein the chain travels over the indexing sprockets from one point of tangency to the other point of tangency to complete an intermittent indexing movement, and a pair of guide plates each having a curved roll guiding surface concentric with its respective indexing sprocket for positively guiding the drive roller at the beginning and at the end of the indexing movement and radially before entering the first sprocket and after leaving the second sprocket.

6. The combination as defined in claim 2 wherein the chain travels over the spaced indexing sprockets from one point of tangency to the other point of tangency to complete an intermittent indexing movement, the total length of the chain being twice or more than twice the length of the portion of the chain extending between said points of tangency.

7. The combination as defined in claim 2 wherein the chain travels over the spaced indexing sprockets from one point of tangency to the other point of tangency to complete an intermittent indexing movement, said chain guiding means including a driving sprocket, the length of that portion of the chain extending between said points of tangency being equal to the pitch circumference of said driving sprocket.

8. The combination as defined in claim 7 which includes a central shaft about which the table is rotated wherein the driving sprocket is fast on a drive shaft, and driving connections between said shafts for rotating the central shaft in cyclical relationship to said intermittent movement.

9. In apparatus of the character described, in combination, a circular table mounted for rotary movement, and means for intermittently rotating the table comprising a plurality of circumferentially spaced and radially extended slotted members carried by said table, said members being directed inwardly from the periphery of the table and having radial slots open at their inner ends, a continuously driven chain disposed within the periphery of the table and carrying a roller for engagement with successive slots to effect intermittent movement of the table, means for driving said chain, means for guiding said chain to cause the roller to enter a slot in a radial direction prior to initiating the intermittent movement and to cause the roller to leave the slot in a radial direction upon termination of the intermittent movement and radially movable means engageable in one of said slots for locking the table in its intermittently moved position and disengageable from the slot prior to initiating a succeeding intermittent movement.

10. The combination as defined in claim 9 wherein the locking means includes means actuated by the driving roll for effecting locking of the table at the end of an intermittent movement and for effecting unlocking of the table immediately prior to initiating a succeeding intermittent movement.

11. The combination as defined in claim 10 wherein the radially movable means comprises a reciprocable locking bar engaging one of the radial slots and operating linkage for moving the bar including an arm having its free end in one position of operation disposed in the path of the roller entering a slot and arranged to be moved out of said path by said drive roller to effect unlocking of the table, and a second arm having its free end in one position of operation disposed in the path of the roller leaving the slot and arranged to be moved by the roller out of the path to effect locking of the table.

12. The combination as defined in claim 11 wherein the operating linkage includes connections between said arms to effect resetting of one arm into the path of the roller when the other arm is moved out of the path by the roller.

13. The combination as defined in claim 12 wherein friction means is provided for holding the locking bar in its moved position until again actuated by said drive roller.

14. The combination as defined in claim 12 wherein the arm disposed in the path of the roller entering a slot is provided with a harmonically curved surface for engagement by the drive roller to effect unlocking of the table.

15. In apparatus of the character described, in combination, a circular table mounted for rotary movement, and means for intermittently rotating the table comprising a plurality of circumferentially spaced and radially extended slotted members carried by the table, said members being directed inwardly from the periphery of the table and having radial slots open at their inner ends, a continuously driven chain including upper and lower chains disposed within the periphery of the table and carrying a roller between the upper and lower chains for engagement with successive slots to effect intermittent movement of the table, means for driving said chain, a plurality of upper and lower sprockets for guiding said chains to cause the roller to enter a slot in a radial direction prior to initiating the intermittent movement and to cause the roller to leave the slot in a radial direction upon termination of the intermittent movement, said sprockets including a drive sprocket, a pair of spaced indexing sprockets disposed within a segment defined by the radial center lines of two adjacent slots and arranged with their pitch lines tangential to their respective radial center lines, the intermittent movement being initiated at one point of tangency by the roller which has entered a slot and terminated at the other point of tangency by the roller leaving the slot, and a roller actuated and radially movable bar engageable in one of the slots for locking the table at the end of an intermittent movement and for unlocking the table immediately prior to initiation of a succeeding intermittent movement.

16. The combination as defined in claim 15 wherein the pitch circumference of the driving sprocket is related to the length of the chain extended between said points of tangency and to the total length of the chain.

17. The combination as defined in claim 15 wherein the driving sprocket is spaced from the center of rotation of the table and is disposed relative to the indexing sprockets in a position beyond the center of the table to accommodate an elongated chain, and wherein the chain guiding means includes a central idle sprocket for guiding the chain around the center of rotation of the table.

18. The combination as defined in claim 17 wherein the central idler sprocket comprises a split sprocket.

19. The combination as defined in claim 15 wherein the chain comprises a roller chain having pin connected links, and wherein the mounting for the drive roller includes a bracket for each chain connected to two adjacent link pins of its respective chain.

20. The combination as defined in claim 15 wherein the chain comprises a roller chain having pin connected links, and wherein the mounting for the drive roller includes two articulated brackets for each chain connected to three adjacent link pins of their respective chain.

References Cited in the file of this patent

UNITED STATES PATENTS

| | | |
|---|---|---|
| 1,775,029 | Hippenmeyer | Sept. 2, 1930 |
| 2,486,128 | Davis | Oct. 25, 1949 |
| 2,512,894 | Gieskieng | June 27, 1950 |
| 2,915,921 | Scholin | Dec. 8, 1959 |

FOREIGN PATENTS

| | | |
|---|---|---|
| 6,061 | Great Britain | Oct. 8, 1908 |